United States Patent Office 3,479,688
Patented Nov. 25, 1969

3,479,688
COLD TREATMENT BEFORE SLAUGHTERING
Theodore M. Hoersch, Park Forest, Ill., assignor to Swift & Company, Chicago, Ill., a corporation of Delaware
No Drawing. Filed Mar. 14, 1967, Ser. No. 622,896
Int. Cl. A22b 5/00
U.S. Cl. 17—45                                      8 Claims

ABSTRACT OF THE DISCLOSURE

Animals such as avians and mammals are subjected to cold treatment for varying periods of time so as to quiet the animals prior to slaughter and to increase the dressed yield.

---

This invention relates in general to the handling of animals in slaughtering operations. More particularly, the invention is directed to an improved method for quieting large animals prior to slaughtering and to immobilizing small animals prior to dispatch.

In the slaughtering of animals, it is desirous to kill the animal with the least excitement possible. The large animals are usually driven into a pen or chute and become very excited prior to being stunned. In the case of avians, the birds are shackled and usually insensibilized by stunning. However, this physical restraint excites the animal, causing undesirable physiological changes in the body.

When concussion or penetration stunning is used to insensibilize an animal prior to bleeding, the animal is usually mechanically restrained in some manner so that the operator can properly place the blow. With the advent of electrical stunning as a humane method of insensibilizing animals, it has been found necessary to restrain each animal to facilitate proper placement of the electrodes on the head. In the case of poultry, the use of electrical stunning provides certain advantages; however, a high degree of skill is required inasmuch as too long a contact with the electrode or too high a charge will kill the bird outright, necessitating a complete loss of product.

In addition, the use of automatic killing machines for poultry requires that the bird be essentially, completely immobilized before coming to the killing point. It is, therefore, quite apparent that a means for quieting and immobilizing poultry which will eliminate electrical stunning would be of great value to the industry. Also, means which, while not immobilizing the larger animals, will quiet them so that one may properly place the gun or electrode against the head of the animal would be very desirable.

It is, therefore, a principal object of this invention to provide a method of immobilizing small animals prior to dispatch.

An additional object of the invention is to provide a method of quieting large animals prior to stunning and slaughtering.

Further objects and advantages if not specifically set forth herein, will become apparent to those skilled in the art from the following description of the invention.

In general, the present invention relates to a method of quieting large animals, i.e., bovine, equine, Suidae, etc., and to a method of quieting and immobilizing avians and small mammals. The procedure of this invention is particularly suitable for the immobilization of fowl. In this connection, the term "fowl" as used herein will be understood to include poultry and all other varieties of edible birds. Non-limiting examples include: chickens, turkeys, geese, ducks, capons, Cornish hens, squab, guinea fowl and pheasants. Additional advantages of the inventive method include increased yields of dressed meat as well as improved palatability due to enhancement of the juiciness of the meat. This is believed to be a result of body fluid transfer from the blood stream to the periphery.

More specifically, the invention relates to a process of quieting and/or immobilizing animals which comprises subjecting the animals to a cold environment for a period of time sufficient to immobilize the voluntary processes of the animal. After emerging from the cold environment, the animals are dispatched in the conventional way. Non-limiting examples of a cold environment include: cold chambers, immersion in ice water, spraying with cold water immediately prior to dispatch, contact with refrigerated metal parts, etc.

The interval of the cold treatment appears to be important, especially in regard to increasing the dressed yields. Subjecting the animal to a cold environment for too long a period will adversely affect the dressed yield. Time, temperature and type of treatment will vary depending upon the type of animal, age, size and sex. Generally speaking, however, treatment times of more than one hour are not only impractical but are considered to be detrimental as far as dressed yield is concerned. By a reading of the examples set forth below, one skilled in the art will be able to readily determine the time, temperature and type of treatment best suited for the particular animal under consideration.

In regard to one embodiment of the invention, and in the case of poultry, contact times of up to 15 minutes actually aid in increasing the dressed yield of the bird, while times of 1 or 2 hours may have a detrimental effect. In assembly line slaughtering of poultry, a contact time of up to 5 minutes and preferably less than 1 or 2 minutes is preferred. A minimum contact period is that period required to sufficiently immobilize the voluntary processes of the animal. Contact periods of a fraction of a second, depending upon the temperature and type of treatment, have been utilized. However, for general purposes in regard to poultry, at least 15 seconds is preferred.

The type of treatment will vary depending upon the type of animal. Immersion in ice cold water or spraying with cold water is preferred when poultry is treated inasmuch as it was found that the skin of the birds should be wetted. When spraying poultry with ice water, i.e., 32–34° F., the birds are held in contact with the water for about 15 seconds to about 2 minutes. On the other hand, when liquid gases are utilized (liquid oxygen, liquid nitrogen, etc.), the contact time will vary between about 15 seconds and about 120 seconds. In this connection it is mentioned that while certain gases can be utilized, carbon dioxide should be avoided inasmuch as it depresses the dressed yield. When using a non-liquid, cold-contact system, the temperature of the gas (normally air) will vary between about —5° C. and about —196° C.

In some instances, improvement in yield has been obtained by merely cooling the heads of the live poultry with ice or ice water application immediately ahead of the killing operation. Other means of immobilization of the poultry by cooling the head has been carried out with satisfactory results. For example, contact of the head may be made by refrigerated metal contact or the application of extremely cold blasts directly squarely at the head of the bird.

Increased yields of up to about 1%, by weight, of the dressed carcass is believed to be due to a redistribution of body fluids. Blood and other fluids have a tendency to shift from the viscera to the periphery, thus dehydrating the digestive tract and providing increased natural fluids for the skeletal muscles and skin. The result is that the palatability of the resulting meat is improved by the enhancement of the juiciness of the meat throughout the carcass. This differs markedly from moisture increase obtained by present ice-chilling procedures in poultry plants in that the latter method results in moisture pick-up largely in the connective tissue adjacent to the skin. On the other hand, the method of this invention effects a complete distribution of the retained moisture throughout the animal body. Accordingly, this increase tends to be retained to a greater degree during cooking than moisture absorbed by chilling in ice water.

With the preferred cold treatment, the animal will remain immobile for about 0.25 to 15 minutes, thus allowing ample time for carrying out any desirable operations prior to killing and bleeding. If it is desired to inject enzyme, flavoring agents, including seasoning agents and butter, or other material into the animals, this can very effectively be accomplished any time after immobilization and during the time that sufficient circulatory action remains in the animal to substantially uniformly distribute the enzyme solution or other material in the capillary network.

The following examples are illustrative only and are not to be construed as limiting the scope of the invention.

EXAMPLE I

A group of New Zealand white male rabbits was employed for the first study. Some rabbits, which served as the control, were weighed and subsequently decapitated. After removing the viscera, the rabbits were reweighed and individual weights noted for the viscera organs. Other rabbits were placed in a 4° F. chamber which had been cooled by salted ice. The chamber also contained a solution of 10% potassium hydroxide and 10% sodium chloride immediately beneath the rabbit and separated therefrom by a mesh screen floor. A vent in the top of the chamber allowed free exchange of gases. The cold treatment was sufficient to cause substantially complete inhibition of voluntary movement by the animal and substantial loss of reflex activity of the skeletal muscles. The cold treatments consisted of 15, 60, and 120 minutes in the chamber. The results are as follows:

| Dressing Percentage | Control, percent | 15 minutes, percent | 60 minutes, percent | 120 minutes, percent |
| --- | --- | --- | --- | --- |
| Head and viscera removed | 56.6 | 57.4 | 54.1 | 56.8 |

A second series of the experiment was conducted with other male rabbits of the same breeding but the treatment consisted of cooling the animals at 24° F. for appropriate intervals in the chamber described above.

| Dressing Percentage | Control, percent | 15 minutes, percent | 60 minutes, percent | 120 minutes, percent |
| --- | --- | --- | --- | --- |
| Head and viscera removed | 61.5 | 62.6 | 60.4 | 60.5 |
| Skin and feet also removed | 46.8 | 48.8 | 46.2 | 46.5 |

The above examples show that by cooling either at 4° or 24° F. for 15 minutes produces a favorable effect as far as dressed yields go whereas treatments lasting either one or two hours may be detrimental.

EXAMPLE II

Chickens weighing 1600–1900 grams each were subjected to a cold environment by placing them in pens which were refrigerated at 0° F. Various chickens were allotted for treatment, and the birds were dispatched immediately after the respective treatments by bleeding in the conventional poultry processing plant procedure. The cold treatment was sufficient to cause substantially complete inhibition of voluntary movement by the animal and substantial loss of reflex activity of the skeletal muscles. For birds that were held in the cold environment for approximately 15 minutes, the average dressed yield was approximately ½ to 1 percent higher than the dressed yield of the controlled chickens.

EXAMPLE III

Chickens were immersed in ice water for 5 minutes and another group of birds were held in contact with chilled water for 2 minutes. Other birds served as untreated controls. The birds subjected to cold treatment showed substantially complete inhibition of voluntary movement. The warm eviscerated dressing percentage of the control birds equaled approximately 66.94%. The dressing percentage for birds subjected to the 2-minute cold treatment equaled 67.13%, while the dressing percentage for birds subjected to the 5-minute cold treatment equaled approximately 67.65%.

EXAMPLE IV

A group of chickens (hens and cockerels) was sprayed with 36° F. water for 1 minute. Another group of the same type of chickens served as untreated controls. Weights were taken on the birds after feather removal, following warm evisceration with giblets included, and after chilling the birds overnight at 56° F.

| | Warm Eviscerated, percent | Chilled, percent |
| --- | --- | --- |
| Control | 74.42 | 72.54 |
| 36–38° F. Sprayed | 75.23 | 73.40 |

The following data indicate that while possibly less blood is lost during the bleeding operation, the major cause for the increase in dressed yield is due to a redistribution of body fluids. The blood and other fluids have a tendency to shift from the viscera to the periphery, thus dehydrating the digestive tract and providing increased natural fluids for the skeletal muscles and skin. This is borne out by the combined giblet (liver, heart and gizzard) weights in the following table:

GIBLETS EXPRESSED AS PERCENT OF LIVE WEIGHT

| | Males, percent | Females, percent | Average, percent |
| --- | --- | --- | --- |
| Control | 3.53 | 4.06 | 3.79 |
| 36–38° F. Sprayed | 3.49 | 4.04 | 3.76 |

Since the giblets of the sprayed chickens possessed a lower percentage weight, it is apparent that the fluids shifted from the viscera to the periphery of the chickens.

EXAMPLE V

Three ewes weighing approximately 150 pounds and which had recently been shorn were sprayed for 5 minutes with cold water (48° F.) and then dispatched. Three other ewes in the same weight range, in short fleece, and of the same apparent breeding were used in untreated controls. The cold treatment was sufficient to cause substantially complete inhibition of the voluntary movement of the animal. The animals appeared quite quiet and were slaughtered after being stunned by a blow in a vulnerable spot on the head. In the control lots, the dressing percentage equaled 46.72%. In the treated lots, the dressing percentage equaled 47.19%.

In order to verify the results, plant tests were conducted wherein various lots of birds were subjected to the cold treatment and other lots used as control. The tests were conducted over several days so as to include all possible variables. Various datum was accumulated; and while the data of individual days or lots varied and overlapped occasionally, the over-all average showed a significant trend. The variability in the individual values was taken into account when evaluation of the difference in means was made. Plant scale results are as follows:

POULTRY SPRAYED LOTS

| No. of Days Production | Live Weight, pounds | Packed Weight, pounds | Yield, percent | Average Weight, pounds |
| --- | --- | --- | --- | --- |
| 13 | 635,052 | 499,041 | 78.582 | 3.46 |
| Average with 95% confidence limits=78.60±1.29 | | | | |

POULTRY CONTROL LOTS

| No. of Days Production | Live Weight, pounds | Packed Weight, pounds | Yield, percent | Average Weight, pounds |
| --- | --- | --- | --- | --- |
| 12 | 575,415 | 449,518 | 78.121 | 3.44 |
| Average with 95% confidence limits=78.9±1.96 | | | | |

Obviously many modifications and variations of the invention as hereinbefore set forth may be made without departing from the spirit and scope thereof.

I claim:
1. A method of handling an animal prior to bleeding said animal which comprises: subjecting the animal to a cold environment having a temperatures of less than 59° F. for less than about fifteen minutes whereby the voluntary movements of said animal are substantially immobilized and dispatching the animal.

2. The method of claim 1 wherein the animal is in contact with a fluid having a temperature of between about 0° F. and about 59° F. for about 15 seconds to about 15 minutes.

3. The method of claim 1 wherein the cold fluid is ice water.

4. A method of handling poultry prior to bleeding which comprises: subjecting the poultry to a cold fluid having a temperature of from about 0° F. to about 48° F. for from about 15 seconds to about 15 minutes whereby the voluntary movements of said poultry are substantially immobilized and thereafter dispatching the poultry while it is substantially immobilized.

5. The method of claim 4 wherein the cold fluid is water.

6. The method of claim 4 wherein the poultry is subjected to ice water for less than about five minutes.

7. The method of claim 4 wherein the poultry is sprayed with water having a temperature of about 32° F. to about 38° F. for about 15 seconds to about 2 minutes.

8. The method of claim 4 wherein the poultry is selected from the group consisting of chickens and turkeys and is sprayed with water for about one minute to about 5 minutes.

References Cited

UNITED STATES PATENTS 2,129,968   9/1938   Sargent et al. _____ 17—11

LUCIE H. LAUDENSLAGER, Primary Examiner

U.S. Cl. X.R.

17—1, 11